(12) United States Patent
Lee et al.

(10) Patent No.: US 7,680,370 B2
(45) Date of Patent: Mar. 16, 2010

(54) OPTICAL WAVELENGTH COUPLER USING MULTI-MODE INTERFERENCE

(75) Inventors: Bongjun Lee, Seoul (KR); Jongkyun Hong, Seoul (KR)

(73) Assignee: Doohwan Lee, Gyeonggi-Do (KR)

( * ) Notice: Subject to any disclaimer, the term of this patent is extended or adjusted under 35 U.S.C. 154(b) by 0 days.

(21) Appl. No.: 11/990,259

(22) PCT Filed: Aug. 12, 2005

(86) PCT No.: PCT/KR2005/002633

§ 371 (c)(1),
(2), (4) Date: Feb. 11, 2008

(87) PCT Pub. No.: WO2007/021040

PCT Pub. Date: Feb. 22, 2007

(65) Prior Publication Data

US 2009/0034907 A1    Feb. 5, 2009

(51) Int. Cl.
*G02B 6/42* (2006.01)
(52) U.S. Cl. .................. 385/20; 385/24; 385/41; 385/42; 385/46

(58) Field of Classification Search ............ 385/21–24, 385/41, 42, 46, 20
See application file for complete search history.

(56) References Cited

U.S. PATENT DOCUMENTS

| 4,674,829 | A  | * | 6/1987  | Bulmer et al. ............... 385/41 |
| 6,631,223 | B2 |   | 10/2003 | Arai et al. |
| 7,171,083 | B2 | * | 1/2007  | Yokouchi et al. ............. 385/41 |
| 2009/0034909 | A1 | * | 2/2009  | Mizumoto et al. ............ 385/42 |

FOREIGN PATENT DOCUMENTS

JP    2000-241644    9/2000

* cited by examiner

*Primary Examiner*—Charlie Peng
(74) *Attorney, Agent, or Firm*—Rabin & Berdo, P.C.

(57) ABSTRACT

Provided is an optical wavelength coupler using a multi-mode interference. The optical wavelength coupler is a planar waveguide type optical device that can distribute or couple two optical signals having different wavelengths by using the multi-mode interference. The optical wavelength coupler is suitable for integration and is small-sized. Also, the optical wavelength coupler has a low manufacturing tolerance and a low loss, and is insensitive to TE/TM polarization.

12 Claims, 3 Drawing Sheets

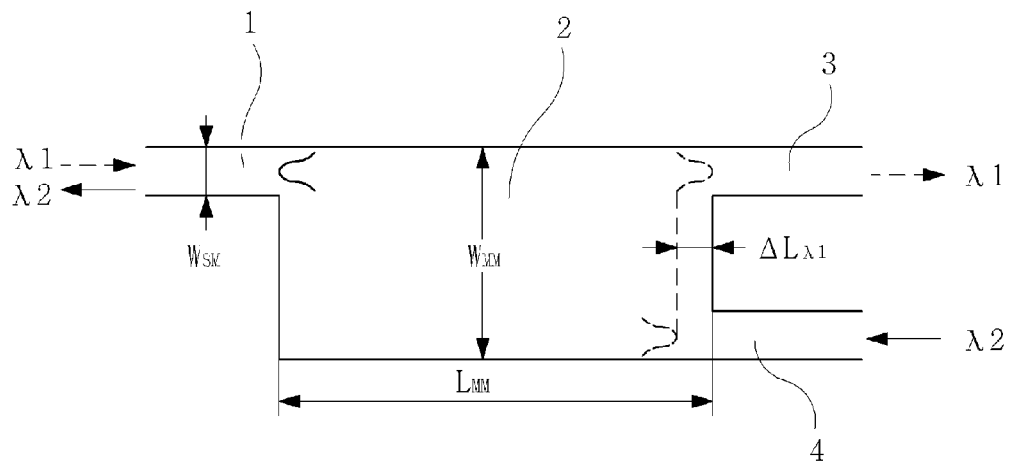
[Fig. 1]
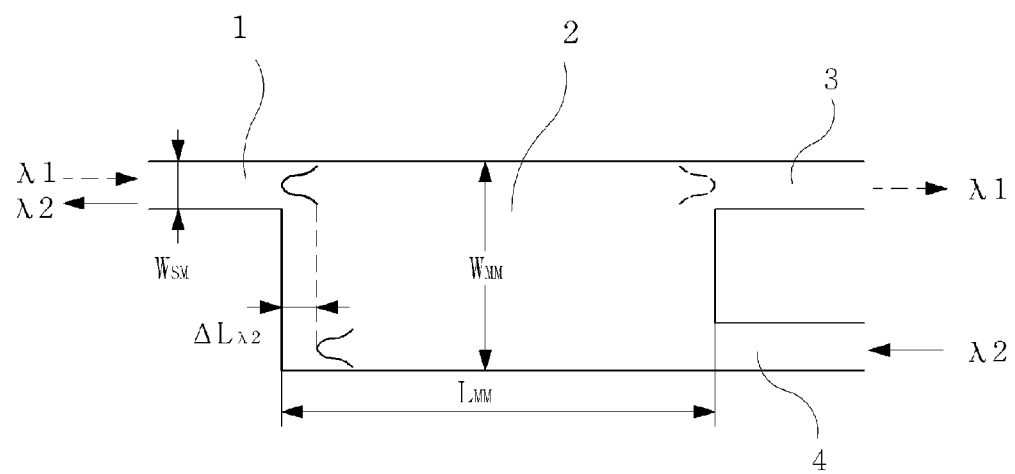
[Fig. 2]
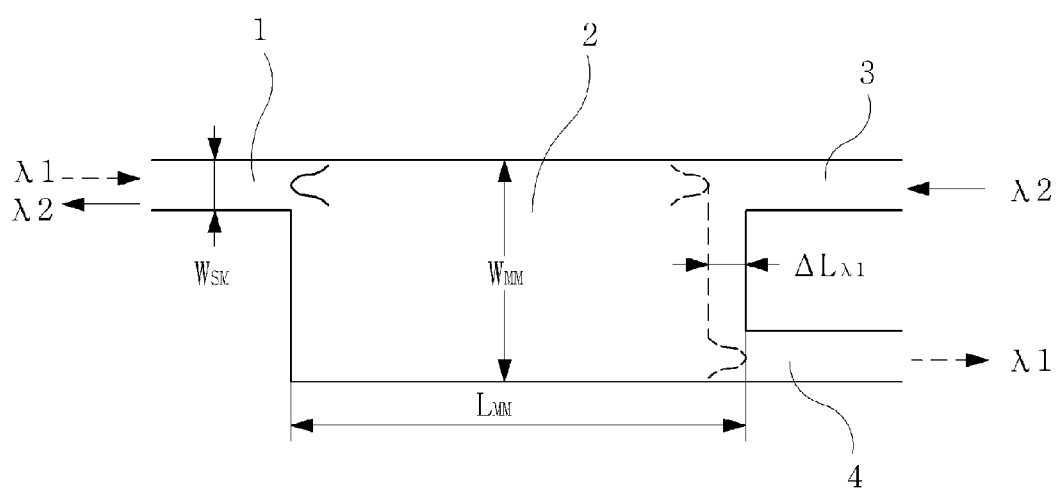
[Fig. 3]

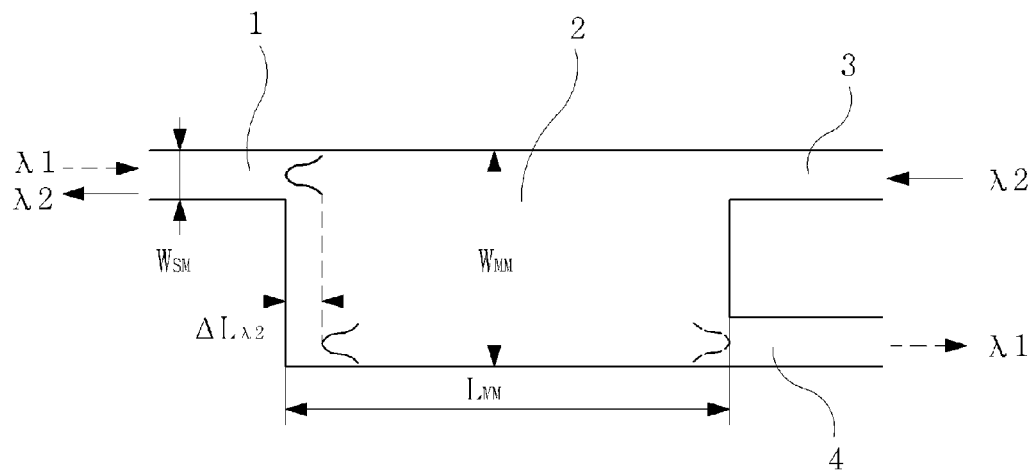
[Fig. 4]
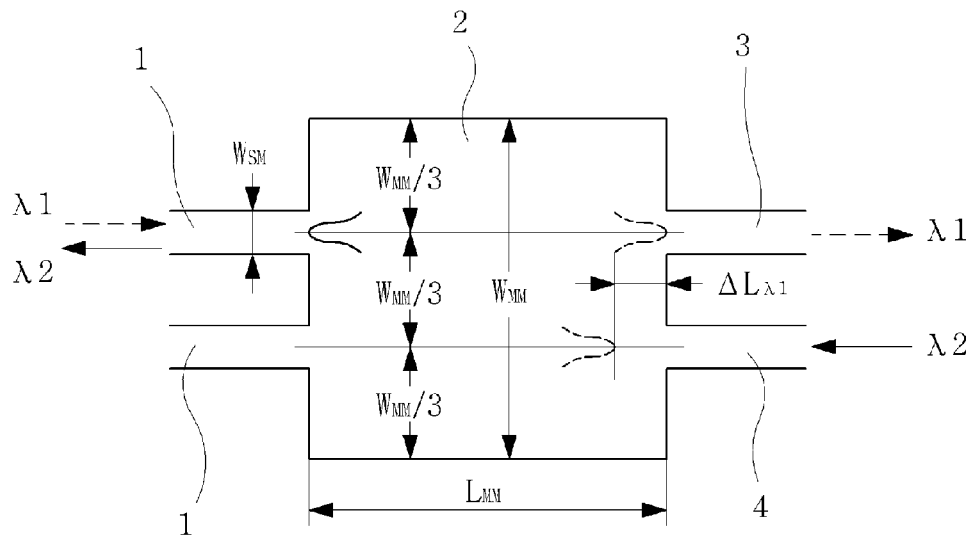
[Fig. 5]
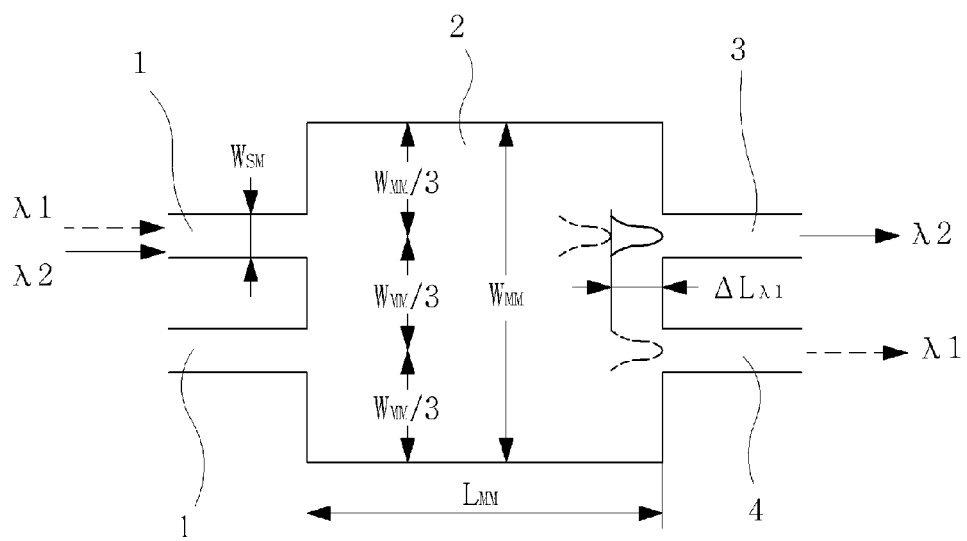
[Fig. 6]

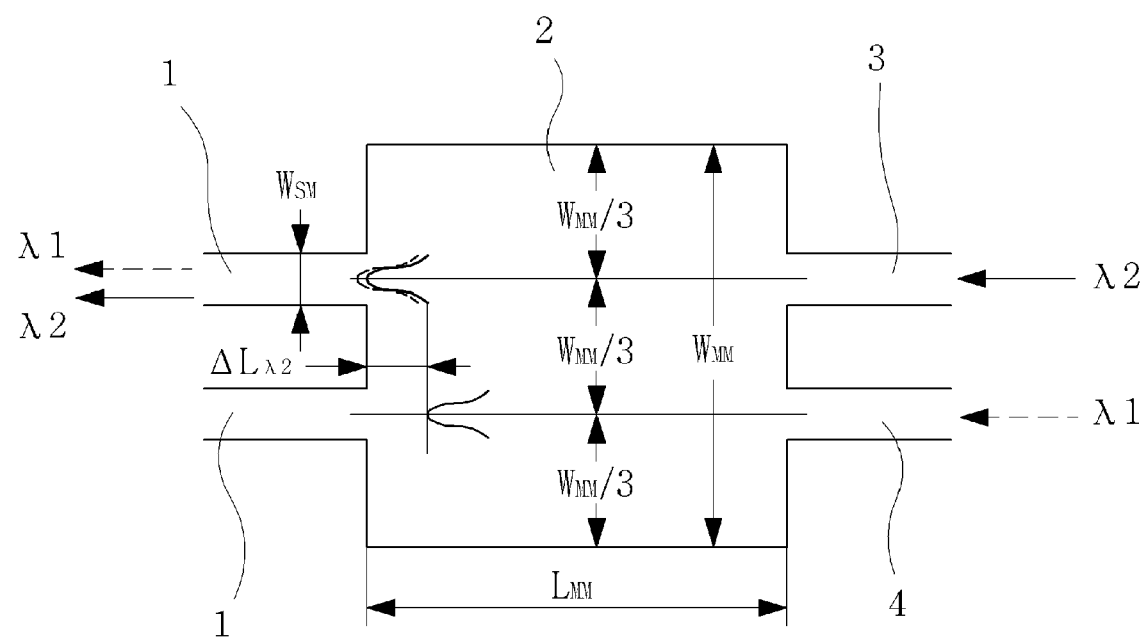
[Fig. 7]

OPTICAL WAVELENGTH COUPLER USING MULTI-MODE INTERFERENCE

TECHNICAL FIELD

The present invention relates to an optical wavelength coupler using a multi-mode interference.

BACKGROUND ART

A time division multiplexing (TDM) system is a communication scheme that is currently used. The TDM system has a capacity of up to 40 Gbps, but cannot effectively receive data that are explosively increasing. Thus, new communication networks have been demanded. In recent years, a wavelength division multiplexing (WDM) scheme has been proposed which can easily support several hundreds of Gbps through a single optical fiber.

The WDM system requires a transceiver module that performs an optic-electric conversion and an electric-optic conversion at a subscriber terminal. In particular, since the WDM system is a two-way communication system having a wavelength of 1310 nm and 1550 nm, a filtering element of the transceiver module is a very important element that separates the two wavelengths. Such a filtering element includes a directional coupler, a thin film filter, and a beam splitter. These elements are an effective power routing element. However, the beam splitter (e.g., disclosed in Korean Patent Publication No. 2001-0041551) relates to a two-way optical circulator and a wavelength divider module that can amplify an optical signal in both two ways in order to achieve a two-way optical communication through a single optical fiber. However, the beam splitter has a disadvantage in that it is difficult to integrate the beam splitter and to configure the beam splitter together with a peripheral transmitting/receiving circuit. The thin film filter (e.g., disclosed in Korean Patent Publication No. 2001-0010582) is a wavelength filtering element that deposits a dielectric film having a suitable refractive index on a substrate to reflect or transmit a desired wavelength. The directional coupler (e.g., disclosed in Korean Patent Publication No. 1999-0020073) is a waveguide element that makes two waveguides close to each other and changes a propagating path of an optical signal from one waveguide to the other waveguide using a mode-coupling.

However, even though it is possible to integrate, these elements have a problem in that there is a limitation as to a miniaturization and a manufacturing tolerance is low. Also, a length of a conventional variable optical filter (e.g., disclosed in Koran Patent No. 0438014 and U.S. Pat. No. 6,690,856 B2) is determined by a beat length ratio of an optical wavelength. Therefore, there is a limitation in implementing a miniaturization and a low loss.

DISCLOSURE OF INVENTION

Technical Problem

Accordingly, the present invention is directed to an optical wavelength coupler that substantially obviates one or more of the problems due to limitations and disadvantages of the related art.

An object of the present invention is to provide an optical wavelength coupler having a PLC waveguide structure with a multi-mode waveguide, in which optical signals that are inputted at one side of a multi-mode waveguide and have wavelengths whose proceeding directions are different from each other are transmitted to opposite sides by using self-image formation and pseudo self-image formation due to a multi-mode interference.

Technical Solution

To achieve these and other advantages and in accordance with the purpose of the present invention, as embodied and broadly described, there is provided an optical wavelength coupler using a multi-mode waveguide (2) with a predetermined thickness (d), a predetermined width ($W_{MM}$), and a predetermined length ($L_{MM}$). The first optical signal ($\lambda_1$) inputted at one side of the multi-mode waveguide (2) is distributed with one or more self-images and pseudo self-images at periodic intervals in a proceeding direction, so that a predetermined optical power is outputted to an opposite side of the multi-mode waveguide (2), and the second optical signal ($\lambda_2$) inputted at one side of the multi-mode waveguide (2) is distributed with one or more self-images and pseudo self-images at periodic intervals in a proceeding direction, so that a predetermined optical power is outputted to an opposite side of the multi-mode waveguide (2).

The first optical signal ($\lambda_1$) and the second optical signal ($\lambda_2$) are directly inputted/outputted to the multi-mode waveguide (2), or are inputted/outputted through a transmission line directly coupled to the multi-mode waveguide (2).

The first optical signal ($\lambda_1$) and the second optical signal ($\lambda_2$) are inputted from the same side of the multi-mode waveguide (2).

The first optical signal ($\lambda_1$) and the second optical signal ($\lambda_2$) are inputted from the different sides of the multi-mode waveguide (2).

The first optical signal ($\lambda_1$) and the second optical signal ($\lambda_2$) are inputted/outputted at positions determined by a general interference with respect to a width direction of the multi-mode waveguide (2). A thickness (d) and width ($W_{MM}$) of the multi-mode waveguide (2) are determined by wavelengths ($\lambda 1$, $\lambda 2$) of the applied optical signals, a refractive index (n) of the waveguide, and a general interference. The length ($L_{MM}$) is determined with a value when a distance where a bar-state pseudo self-image is formed by the general interference while the first optical signal ($\lambda_1$) proceeds in the multi-mode waveguide (2) is equal to a distance in which a cross-state self-image is formed by the general interference while the second optical signal ($\lambda_2$) proceeds in the multi-mode waveguide (2).

The first optical signal ($\lambda_1$) and the second optical signal ($\lambda_2$) are inputted/outputted at positions determined by a general interference with respect to a width direction of the multi-mode waveguide (2). A thickness (d) and width ($W_{MM}$) of the multi-mode waveguide (2) are determined by wavelengths ($\lambda 1$, $\lambda 2$) of the applied optical signals, a refractive index (n) of the waveguide, and a general interference. The length ($L_{MM}$) is determined with a value when a distance where a bar-state self-image is formed by the general interference while the first optical signal ($\lambda_1$) proceeds in the multi-mode waveguide (2) is equal to a distance in which a cross-state pseudo self-image is formed by the general interference while the second optical signal ($\lambda_2$) proceeds in the multi-mode waveguide (2).

The first optical signal ($\lambda_1$) and the second optical signal ($\lambda_2$) are inputted/outputted at positions determined by a general interference with respect to a width direction of the multi-mode waveguide (2). A thickness (d) and width ($W_{MM}$) of the multi-mode waveguide (2) are determined by wavelengths ($\lambda 1$, $\lambda 2$) of the applied optical signals, a refractive index (n) of the waveguide, and a general interference. The length ($L_{MM}$) is determined with a value when a distance where a cross-state pseudo self-image is formed by the general interference while the first optical signal ($\lambda_1$) proceeds in the multi-mode waveguide (2) is equal to a distance in which a bar-state self-image is formed by the general interference while the second optical signal ($\lambda_2$) proceeds in the multi-mode waveguide (2).

The first optical signal ($\lambda_1$) and the second optical signal ($\lambda_2$) are inputted/outputted at positions determined by a general interference with respect to a width direction of the multi-mode waveguide (2). A thickness (d) and width ($W_{MM}$) of the multi-mode waveguide (2) are determined by wavelengths ($\lambda 1$, $\lambda 2$) of the applied optical signals, a refractive index (n) of the waveguide, and a general interference. The length ($L_{MM}$) is determined with a value when a distance where a cross-state self-image is formed by the general interference while the first optical signal ($\lambda_1$) proceeds in the multi-mode waveguide (2) is equal to a distance in which a bar-state pseudo self-image is formed by the general interference while the second optical signal ($\lambda_2$) proceeds in the multi-mode waveguide (2).

The first optical signal ($\lambda_1$) and the second optical signal ($\lambda_2$) are inputted/outputted at positions determined by a paired interference with respect to a width direction of the multi-mode waveguide (2). A thickness (d) and width ($W_{MM}$) of the multi-mode waveguide (2) are determined by wavelengths ($\lambda 1$, $\lambda 2$) of the applied optical signals, a refractive index (n) of the waveguide, and a paired interference. The length ($L_{MM}$) is determined with a value when a distance where a bar-state pseudo self-image is formed by the paired interference while the first optical signal ($\lambda_1$) proceeds in the multi-mode waveguide (2) is equal to a distance in which a cross-state self-image is formed by the paired interference while the second optical signal ($\lambda_2$) proceeds in the multi-mode waveguide (2).

The first optical signal ($\lambda_1$) and the second optical signal ($\lambda_2$) are inputted/outputted at positions determined by a paired interference with respect to a width direction of the multi-mode waveguide (2). A thickness (d) and width ($W_{MM}$) of the multi-mode waveguide (2) are determined by wavelengths ($\lambda 1$, $\lambda 2$) of the applied optical signals, a refractive index (n) of the waveguide, and a paired interference. The length ($L_{MM}$) is determined with a value when a distance where a bar-state self-image is formed by the paired interference while the first optical signal ($\lambda_1$) proceeds in the multi-mode waveguide (2) is equal to a distance in which a cross-state pseudo self-image is formed by the paired interference while the second optical signal ($\lambda_2$) proceeds in the multi-mode waveguide (2).

The first optical signal ($\lambda_1$) and the second optical signal ($\lambda_2$) are inputted/outputted at positions determined by a paired interference with respect to a width direction of the multi-mode waveguide (2). A thickness (d) and width ($W_{MM}$) of the multi-mode waveguide (2) are determined by wavelengths ($\lambda 1$, $\lambda 2$) of the applied optical signals, a refractive index (n) of the waveguide, and a paired interference. The length ($L_{MM}$) is determined with a value when a distance where a cross-state pseudo self-image is formed by the paired interference while the first optical signal ($\lambda_1$) proceeds in the multi-mode waveguide (2) is equal to a distance in which a bar-state self-image is formed by the paired interference while the second optical signal ($\lambda_2$) proceeds in the multi-mode waveguide (2).

The first optical signal ($\lambda_1$) and the second optical signal ($\lambda_2$) are inputted/outputted at positions determined by a paired interference with respect to a width direction of the multi-mode waveguide (2). A thickness (d) and width ($W_{MM}$) of the multi-mode waveguide (2) are determined by wavelengths ($\lambda 1$, $\lambda 2$) of the applied optical signals, a refractive index (n) of the waveguide, and a paired interference. The length ($L_{MM}$) is determined with a value when a distance where a cross-state self-image is formed by the paired interference while the first optical signal ($\lambda_1$) proceeds in the multi-mode waveguide (2) is equal to a distance in which a bar-state pseudo self-image is formed by the paired interference while the second optical signal ($\lambda_2$) proceeds in the multi-mode waveguide (2).

Advantageous Effects

When the optical wavelength coupler according to the present invention is applied to a WDM system and a two-way transceiver module, which couple or distribute an optical wavelength, an optimal operation characteristic can be obtained due to an output characteristic that is insensitive to polarization. Also, by applying the multi-mode waveguide, a manufacturing tolerance is extended, thus increasing production yield. Moreover, the integration and miniaturization are possible.

BRIEF DESCRIPTION OF THE DRAWINGS

FIG. 1 is a view illustrating an optical wavelength coupler according to a first embodiment of the present invention;

FIG. 2 is a view illustrating an optical wavelength coupler according to a second embodiment of the present invention;

FIG. 3 is a view illustrating an optical wavelength coupler according to a third embodiment of the present invention;

FIG. 4 is a view illustrating an optical wavelength coupler according a fourth embodiment of the present invention;

FIG. 5 is a view illustrating an optical wavelength coupler according to a fifth embodiment of the present invention;

FIG. 6 is a view illustrating an optical wavelength coupler according to a sixth embodiment of the present invention; and FIG. 7 is a view illustrating an optical wavelength coupler according to a seventh embodiment of the present invention.

BEST MODE FOR CARRYING OUT THE INVENTION

Hereinafter, preferred embodiments of the present invention will be described in detail with reference to accompanying drawings.

When an optical signal is input to a multi-mode waveguide and proceeds, the optical signal is distributed, and an image of a wave excited in an input optical signal is reproduced in a predetermined length by a constructive interference between modes. This is an inherent characteristic of light called a self-image formation, and is a phenomenon that one or more images are periodically formed along a proceed direction of the waveguide. A basic principle of this self-image formation is described in J. Lightwave Technol., vol. 13, p. 615, 1995. The optical wave distribution within the multi-mode waveguide can be expressed as Equation (1):

$$\Psi(y \cdot z) = \sum_{v=0}^{m-1} c_v \Psi_v(y) \exp[j(\omega t - \beta_v z)] \quad \text{MathFigure 1}$$

where $\psi$ denotes an excited mode, and v denotes order of mode.

In case that the input position of the optical signal is located at a general location of the multi-mode waveguide, when the general interference is used, the length that a desired number of self-images are formed is given by Equation (2):

$$L = \frac{M}{N}(3L_\pi)  \qquad \text{MathFigure 2}$$

In case that the I/O position is located at a W/3 position or a 2 W/3 position of the multi-mode waveguide, when the paired interference is used, a length that a desired number of self-images are formed is obtained by Equation (3):

$$L = \frac{M}{N}L_\pi  \qquad \text{MathFigure 3}$$

where M denotes an integer (p is an even number and q is an odd number) representing a period, and N denotes the number of self-images, and $L_\pi$ denotes a beat length and is obtained by Equation (4):

$$L_\pi = \frac{\pi}{(\beta_0 - \beta_1)} \simeq \frac{4n_e W_e^2}{3\lambda_0}  \qquad \text{MathFigure 4}$$

where $\beta_0$ and $\beta_1$ denote a propagation constant of a standard mode and a propagation constant of a first mode, respectively, $\lambda_0$ denotes a wavelength, $n_e$ denotes an effective refractive index, and $W_e$ denotes a substantial width of the standard mode.

When the multi-mode waveguide is not a strong guiding and a number of the mode excited within the multi-mode waveguide is restricted, the inputted optical signal forms a self-image at a distance given by Equations (2) and (3) while proceeding in the multi-mode waveguide. Modes that are deviated from an ideal phase relation and has a phase error $$(\Delta\phi_v)$$

as expressed as Equation (5) progress $$\Delta L(<L_\pi)$$

at a distance in which the self-image is formed, and then form pseudo self-image.

$$A: \phi_{v(even)} + \Delta\phi_{v(even)} = \phi_{v(odd)} + \Delta\phi_{v(odd)}$$

$$B: \phi_{v(even)} + \Delta\phi_{v(even)} = \phi_{v(odd)} + \Delta\phi_{v(odd)} + 180°  \qquad \text{MathFigure 5}$$

At this point, when the self-image is a bar-state (A), the pseudo self-image becomes a cross-state. When the self-image is a cross-state (B), the pseudo self-image becomes a bar-state.

As shown in FIG. 1, an optical waveform coupler according to a first embodiment of the present invention includes a first single-mode waveguide 1, a second single-mode waveguide 3, a third single-mode waveguide 4, and a multi-mode waveguide 2. The first, second and third single-mode waveguides 1, 3 and 4 have a thickness (d) and width ($W_{SM}$) determined by wavelengths ($\lambda 1$, $\lambda 2$) of the applied optical signal and a refractive index (n) of the waveguide, and the multi-mode waveguide 2 has a thickness (d) and width ($W_{MM}$) determined by wavelengths ($\lambda 1$, $\lambda 2$) of the applied optical signal, a refractive index (n) of the waveguide, and a general interference. The first single-mode waveguide 1 becomes an input waveguide of the optical signal ($\lambda 1$) having a first wavelength and an output waveguide of the optical signal ($\lambda 2$) having a second wavelength at one side of the multi-mode waveguide 2. The first single-mode waveguide 1 is directly coupled to a width-direction edge of the multi-mode waveguide 2. The second single-mode waveguide 3 becomes an input waveguide of the optical signal ($\lambda 1$) having the first wavelength and the third single-mode waveguide 4 becomes an input waveguide of the optical signal ($\lambda 2$) having the second wavelength at the other side of the multi-mode waveguide 2. The second and third single-mode waveguides 3 and 4 are directly coupled to a width-direction edge of the multi-mode waveguide 2. The optical signal ($\lambda 1$) that has the first wavelength and is inputted from the first single-mode waveguide 1 to the multi-mode waveguide 2 forms a cross-state self-image at $$L_{\lambda_1} = q(3L_{\pi(\lambda_1)})$$

by Equations (2) and (4) and forms a bar-state pseudo self-image at a position located away by $$\Delta L_{\lambda_1}(<L_{\pi(\lambda_1)})$$

due to a phase mismatch and then is transferred to the second single-mode waveguide 3. Also, the optical signal ($\lambda 2$) that has the second wavelength and is inputted from the third single-mode waveguide 4 to the multi-mode waveguide 2 forms a cross-state self-image at $$L_{\lambda_2} = q(3L_{\pi(\lambda_2)})$$

by Equations (2) and (4) and then is transferred to the first single-mode waveguide 1. Therefore, the length ($L_{MM}$) of the multi-mode waveguide 2 is determined such that a proceeding distance $$(L_{\lambda_1} + \Delta L_{\lambda_1})$$

of the optical signal ($\lambda 1$) having the first wavelength is equal to the proceeding distance $$(L_{\lambda_2})$$

of the optical signal ($\lambda_2$) having the second wavelength.

As shown in FIG. 2, an optical waveform coupler according to a second embodiment of the present invention includes a first single-mode waveguide 1, a second single-mode waveguide 3, a third single-mode waveguide 4, and a multi-mode waveguide 2. The first, second and third single-mode waveguides 1, 3 and 4 have a thickness (d) and width ($W_{SM}$) determined by wavelengths ($\lambda 1$, $\lambda 2$) of the applied optical signal and a refractive index (n) of the waveguide, and the multi-mode waveguide 2 has a thickness (d) and width ($W_{MM}$) determined by wavelengths ($\lambda 1$, $\lambda 2$) of the applied optical signal, a refractive index (n) of the waveguide, and a general interference. The first single-mode waveguide 1 becomes an input waveguide of the optical signal ($\lambda 1$) having a first wavelength and an output waveguide of the optical signal ($\lambda 2$) having a second wavelength at one side of the multi-mode waveguide 2. The first single-mode waveguide 1 is directly coupled to a width-direction edge of the multi-mode waveguide 2. The second single-mode waveguide 3 becomes an output waveguide of the optical signal ($\lambda 1$) having the first wavelength and the third single-mode waveguide 4 becomes an input waveguide of the optical signal ($\lambda 2$) having the second wavelength at the other side of the multi-mode waveguide 2. The second and third single-mode waveguides 3 and 4 are directly coupled to a width-direction edge of the multi-mode waveguide 2. The optical signal ($\lambda 1$) that has the first wavelength and is inputted from the first single-mode waveguide 1 to the multi-mode waveguide 2 forms a bar-state self-image at $$L_{\lambda_1} = p(3L_{\pi(\lambda_1)})$$

by Equations (2) and (4) and then is transferred to the second single-mode waveguide 3. Also, the optical signal (λ2) that has the second wavelength and is inputted from the third single-mode waveguide 4 to the multi-mode waveguide 2 forms a bar-state self-image at $$L_{\lambda_2}=p(3L_{\pi(\lambda_2)})$$

by Equations (2) and (4), and forms a cross-state pseudo self-image at a position located away by $$\Delta L_{\lambda_2}(<L_{\pi(\lambda_2)})$$

due to a phase mismatch and then is transferred to the first single-mode waveguide 1. Therefore, the length ($L_{MM}$) of the multi-mode waveguide 2 is determined such that a proceeding distance $$(L_{\lambda_1})$$

of the optical signal (λ1) having the first wavelength is equal to the proceeding distance $$(L_{\lambda_2}+\Delta L_{\lambda_2})$$

of the optical signal ($\lambda_2$) having the second wavelength.

As shown in FIG. 3, an optical waveform coupler according to a third embodiment of the present invention includes a first single-mode waveguide 1, a second single-mode waveguide 3, a third single-mode waveguide 4, and a multi-mode waveguide 2. The first, second and third single-mode waveguides 1, 3 and 4 have a thickness (d) and width ($W_{SM}$) determined by wavelengths (λ1, λ2) of the applied optical signal and a refractive index (n) of the waveguide, and the multi-mode waveguide 2 has a thickness (d) and width ($W_{MM}$) determined by wavelengths (λ1, λ2) of the applied optical signal, a refractive index (n) of the waveguide, and a general interference. The first single-mode waveguide 1 becomes an input waveguide of the optical signal (λ1) having a first wavelength and an output waveguide of the optical signal (λ2) having a second wavelength at one side of the multi-mode waveguide 2. The first single-mode waveguide 1 is directly coupled to a width-direction edge of the multi-mode waveguide 2. The third single-mode waveguide 4 becomes an output waveguide of the optical signal (λ1) having the first wavelength and the second single-mode waveguide 3 becomes an input waveguide of the optical signal (λ2) having the second wavelength at the other side of the multi-mode waveguide 2. The second and third single-mode waveguides 3 and 4 are directly coupled to a width-direction edge of the multi-mode waveguide 2. The optical signal (λ1) that has the first wavelength and is inputted from the first single-mode waveguide 1 to the multi-mode waveguide 2 forms a bar-state self-image at $$L_{\lambda_1}=p(3L_{\pi(\lambda_1)})$$

by Equations (2) and (4) and forms a cross-state pseudo self-image at a position located away by $$\Delta L_{\lambda_1}(<L_{\pi(\lambda_1)})$$

due to a phase mismatch and then is transferred to the third single-mode waveguide 4. Also, the optical signal (λ2) that has the second wavelength and is inputted from the second single-mode waveguide 3 to the multi-mode waveguide 2 forms a bar-state self-image at $$L_{\lambda_2}=p(3L_{\pi(\lambda_2)})$$

by Equations (2) and (4) and then is transferred to the first single-mode waveguide 1. Therefore, the length ($L_{MM}$) of the multi-mode waveguide 2 is determined such that a proceeding distance $$(L_{\lambda_1}+\Delta L_{\lambda_1})$$

of the optical signal (λ1) having the first wavelength is equal to the proceeding distance $$(L_{\lambda_2})$$

of the optical signal ($\lambda_2$) having the second wavelength.

As shown in FIG. 4, an optical waveform coupler according to a fourth embodiment of the present invention includes a first single-mode waveguide 1, a second single-mode waveguide 3, a third single-mode waveguide 4, and a multi-mode waveguide 2. The first, second and third single-mode waveguides 1, 3 and 4 have a thickness (d) and width ($W_{SM}$) determined by wavelengths (λ1, λ2) of the applied optical signal and a refractive index (n) of the waveguide, and the multi-mode waveguide 2 has a thickness (d) and width ($W_{MM}$) determined by wavelengths (λ1, λ2) of the applied optical signal, a refractive index (n) of the waveguide, and a general interference. The first single-mode waveguide 1 becomes an input waveguide of the optical signal (λ1) having a first wavelength and an output waveguide of the optical signal (λ2) having a second wavelength at one side of the multi-mode waveguide 2. The first single-mode waveguide 1 is directly coupled to a width-direction edge of the multi-mode waveguide 2. The third single-mode waveguide 4 becomes an output waveguide of the optical signal (λ1) having the first wavelength and the second single-mode waveguide 3 becomes an input waveguide of the optical signal (λ2) having the second wavelength at the other side of the multi-mode waveguide 2. The second and third single-mode waveguides 3 and 4 are directly coupled to a width-direction edge of the multi-mode waveguide 2. The optical signal (λ1) that has the first wavelength and is inputted from the first single-mode waveguide 1 to the multi-mode waveguide 2 forms a cross-state self-image at $$L_{\lambda_1}=q(3L_{\pi(\lambda_1)})$$

by Equations (2) and (4) and then is transferred to the third single-mode waveguide 4. Also, the optical signal (λ2) that has the second wavelength and is inputted from the second single-mode waveguide 3 to the multi-mode waveguide 2 forms a cross-state self-image at $$L_{\lambda_2}=q(3L_{\pi(\lambda_2)})$$

by Equations (2) and (4), and forms a bar-state pseudo self-image at a position located away by $$\Delta L_{\lambda_2}(<L_{\pi(\lambda_2)})$$

due to a phase mismatch and then is transferred to the first single-mode waveguide 1. Therefore, the length ($L_{MM}$) of the multi-mode waveguide 2 is determined such that a proceeding distance $$(L_{\lambda_1})$$

of the optical signal (λ1) having the first wavelength is equal to the proceeding distance $$(L_{\lambda_2}+\Delta L_{\lambda_2})$$

of the optical signal ($\lambda_2$) having the second wavelength.

As shown in FIG. 5, an optical waveform coupler according to a fifth embodiment of the present invention includes a first single-mode waveguide 1, a second single-mode waveguide 3, a third single-mode waveguide 4, and a multi-mode waveguide 2. The first, second and third single-mode waveguides 1, 3 and 4 have a thickness (d) and width ($W_{SM}$) determined by wavelengths ($\lambda 1$, $\lambda 2$) of the applied optical signal and a refractive index (n) of the waveguide, and the multi-mode waveguide 2 has a thickness (d) and width ($W_{MM}$) determined by wavelengths ($\lambda 1$, $\lambda 2$) of the applied optical signal, a refractive index (n) of the waveguide, and a paired interference. The first single-mode waveguide 1 becomes an input waveguide of the optical signal ($\lambda 1$) having a first wavelength and an output waveguide of the optical signal ($\lambda 2$) having a second wavelength at one side of the multi-mode waveguide 2. The first single-mode waveguide 1 is directly coupled to a W/3 position or a 2 W/3 position of the width direction of the multi-mode waveguide 2. The second single-mode waveguide 3 becomes an input waveguide of the optical signal ($\lambda 1$) having the first wavelength and the third single-mode waveguide 4 becomes an input waveguide of the optical signal ($\lambda 2$) having the second wavelength at the other side of the multi-mode waveguide 2. The second and third single-mode waveguides 3 and 4 are directly coupled to a W/3 position or a 2 W/3 position of the width direction of the multi-mode waveguide 2. The optical signal ($\lambda 1$) that has the first wavelength and is inputted from the first single-mode waveguide 1 to the multi-mode waveguide 2 forms a cross-state self-image at $$L_{\lambda_1} = q(L_{\pi(\lambda_1)})$$

by Equations (3) and (4) and forms a bar-state pseudo self-image at a position located away by $$\Delta L_{\lambda_1} (< L_{\pi(\lambda_1)})$$

due to a phase mismatch and then is transferred to the second single-mode waveguide 3. Also, the optical signal ($\lambda 2$) that has the second wavelength and is inputted from the third single-mode waveguide 4 to the multi-mode waveguide 2 forms a cross-state self-image at $$L_{\lambda_2} = q(L_{\pi(\lambda_2)})$$

by Equations (3) and (4) and then is transferred to the first single-mode waveguide 1. Therefore, the length ($L_{MM}$) of the multi-mode waveguide 2 is determined such that a proceeding distance $$(L_{\lambda_1} + \Delta L_{\lambda_1})$$

of the optical signal ($\lambda 1$) having the first wavelength is equal to the proceeding distance $$(L_{\lambda_2})$$

of the optical signal ($\lambda_2$) having the second wavelength.

As shown in FIG. 6, an optical waveform coupler according to a sixth embodiment of the present invention includes a first single-mode waveguide 1, a second single-mode waveguide 3, a third single-mode waveguide 4, and a multi-mode waveguide 2. The first, second and third single-mode waveguides 1, 3 and 4 have a thickness (d) and width ($W_{SM}$) determined by wavelengths ($\lambda 1$, $\lambda 2$) of the applied optical signal and a refractive index (n) of the waveguide, and the multi-mode waveguide 2 has a thickness (d) and width ($W_{MM}$) determined by wavelengths ($\lambda 1$, $\lambda 2$) of the applied optical signal, a refractive index (n) of the waveguide, and a paired interference. The first single-mode waveguide 1 becomes an input waveguide of the optical signal ($\lambda 1$) having a first wavelength and an output waveguide of the optical signal ($\lambda 2$) having a second wavelength at one side of the multi-mode waveguide 2. The first single-mode waveguide 1 is directly coupled to a W/3 position or a 2W/3 position of the width direction of the multi-mode waveguide 2. The third single-mode waveguide 4 becomes an output waveguide of the optical signal ($\lambda 1$) having the first wavelength and the second single-mode waveguide 3 becomes an output waveguide of the optical signal ($\lambda 2$) having the second wavelength at the other side of the multi-mode waveguide 2. The second and third single-mode waveguides 3 and 4 are directly coupled to a W/3 position or a 2 W/3 position of the width direction of the multi-mode waveguide 2. The optical signal ($\lambda 1$) that has the first wavelength and is inputted from the first single-mode waveguide 1 to the multi-mode waveguide 2 forms a bar-state self-image at $$L_{\lambda_1} = p(L_{\pi(\lambda_1)})$$

by Equations (3) and (4) and forms a cross-state pseudo self-image at a position located away by $$\Delta L_{\lambda_1} (< L_{\pi(\lambda_1)})$$

due to a phase mismatch and then is transferred to the third single-mode waveguide 4. Also, the optical signal ($\lambda 2$) that has the second wavelength and is inputted from the first single-mode waveguide 1 to the multi-mode waveguide 2 forms a bar-state self-image at $$L_{\lambda_2} = p(L_{\pi(\lambda_2)})$$

by Equations (3) and (4) and then is transferred to the second single-mode waveguide 3. Therefore, the length ($L_{MM}$) of the multi-mode waveguide 2 is determined such that a proceeding distance $$(L_{\lambda_1} + \Delta L_{\lambda_1})$$

of the optical signal ($\lambda 1$) having the first wavelength is equal to the proceeding distance $$(L_{\lambda_2})$$

of the optical signal ($\lambda 2$) having the second wavelength.

As shown in FIG. 7, an optical waveform coupler according to a seventh embodiment of the present invention includes a first single-mode waveguide 1, a second single-mode waveguide 3, a third single-mode waveguide 4, and a multi-mode waveguide 2. The first, second and third single-mode waveguides 1, 3 and 4 have a thickness (d) and width ($W_{SM}$) determined by wavelengths ($\lambda 1$, $\lambda 2$) of the applied optical signal and a refractive index (n) of the waveguide, and the multi-mode waveguide 2 has a thickness (d) and width ($W_{MM}$) determined by wavelengths ($\lambda 1$, $\lambda 2$) of the applied optical signal, a refractive index (n) of the waveguide, and a paired interference. The third single-mode waveguide 4 and the second single-mode waveguide 3 become an input waveguide of the optical signal ($\lambda 1$) having a first wavelength and an input waveguide of the optical signal ($\lambda 2$) having a second wavelength at one side of the multi-mode waveguide 2. The third and second single-mode waveguides 4 and 3 are directly coupled to a W/3 position or a 2 W/3 position of the width direction of the multi-mode waveguide 2. The first single-mode waveguide 1 becomes an output waveguide of the optical signal ($\lambda 1$) having the first wavelength and an output waveguide of the optical signal ($\lambda 2$) having the second wavelength at the other side of the multi-mode waveguide 2. The first single-mode waveguide 1 is directly coupled to a W/3 position and a 2 W/3 position of the width direction of the multi-mode waveguide 2. The optical signal ($\lambda 1$) that has the first wavelength and is inputted from the third single-mode waveguide 4 to the multi-mode waveguide 2 forms a cross-state self-image at $$L_{\lambda_1} = q(L_{\pi(\lambda_1)})$$

by Equations (3) and (4) and then is transferred to the third single-mode waveguide 1. Also, the optical signal (λ2) that has the second wavelength and is inputted from the second single-mode waveguide 3 to the multi-mode waveguide 2 forms a cross-state self-image at $$L_{\lambda_2} = q(L_{\pi(\lambda_2)})$$

by Equations (3) and (4), and forms a bar-state pseudo self-image at a position located away by $$\Delta L_{\lambda_2} (< L_{\pi(\lambda_2)})$$

due to a phase mismatch and then is transferred to the first single-mode waveguide 1. Therefore, the length ($L_{MM}$) of the multi-mode waveguide 2 is determined such that a proceeding distance $$(L_{\lambda_1})$$

of the optical signal (λ1) having the first wavelength is equal to the proceeding distance $$(L_{\lambda_2} + \Delta L_{\lambda_2})$$

of the optical signal ($\lambda_2$) having the second wavelength.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. An optical wavelength coupler comprising:
 a multi-mode waveguide (2) having a thickness (d) and a width ($W_{MM}$) determined by wavelengths ($\lambda_1, \lambda_2$) of a first or second optical signal, a refractive index (n) of the multi-mode waveguide, and an interference on the multi-mode waveguide, and having a length ($L_{MM}$) determined by a distance in which self-images or pseudo self-images of the first optical signal ($\lambda_1$) and the second optical signal ($\lambda_2$) are formed, the multi-mode waveguide (2) distributing the first optical signal ($\lambda_1$) or the second optical signal ($\lambda_2$) inputted at one side of the multi-mode waveguide (2), with one or more self-images and pseudo self-images at periodic intervals in a proceeding direction, so as to output at its opposite side a predetermined optical power.

2. The optical wavelength coupler of claim 1, wherein the first optical signal ($\lambda_1$) and the second optical signal ($\lambda_2$) are directly inputted/outputted to the multi-mode waveguide (2), or are inputted/outputted through a transmission line directly coupled to the multi-mode waveguide (2).

3. The optical wavelength coupler of claim 1, wherein the first optical signal ($\lambda_1$) and the second optical signal ($\lambda_2$) are inputted from the same side of the multi-mode waveguide (2).

4. The optical wavelength coupler of claim 1, wherein the first optical signal ($\lambda_1$) and the second optical signal ($\lambda_2$) are inputted from the different sides of the multi-mode waveguide (2).

5. The optical wavelength coupler of claim 1, wherein the first optical signal ($\lambda_1$) and the second optical signal ($\lambda_2$) are inputted/outputted at positions determined by a general interference with respect to a width direction of the multi-mode waveguide (2);
 the thickness (d) and width ($W_{MM}$) of the multi-mode waveguide (2) are determined by wavelengths (λ1,λ2) of the applied optical signals, a refractive index (n) of the waveguide, and a general interference; and the length ($L_{MM}$) is determined with a value when a first distance where a bar-state pseudo self-image is formed by the general interference while the first optical signal ($\lambda_1$) proceeds in the multi-mode waveguide (2) is equal to a second distance in which a cross-state self-image is formed by the general interference while the second optical signal ($\lambda_2$) proceeds in the multi-mode waveguide (2).

6. The optical wavelength coupler of claim 1, wherein the first optical signal ($\lambda_1$) and the second optical signal ($\lambda_2$) are inputted/outputted at positions determined by a general interference with respect to a width direction of the multi-mode waveguide (2);
 a thickness (d) and width ($W_{MM}$) of the multi-mode waveguide (2) are determined by wavelengths (λ1,λ2) of the applied optical signals, a refractive index (n) of the waveguide, and a general interference; and
 the length ($L_{MM}$) is determined with a value when a distance where a bar-state self-image is formed by the general interference while the first optical signal ($\lambda_1$) proceeds in the multi-mode waveguide (2) is equal to a distance in which a cross-state pseudo self-image is formed by the general interference while the second optical signal ($\lambda_2$) proceeds in the multi-mode waveguide (2).

7. The optical wavelength coupler of claim 1, wherein the first optical signal ($\lambda_1$) and the second optical signal ($\lambda_2$) are inputted/outputted at positions determined by a general interference with respect to a width direction of the multi-mode waveguide (2);
 a thickness (d) and width ($W_{MM}$) of the multi-mode waveguide (2) are determined by wavelengths (λ1,λ2) of the applied optical signals, a refractive index (n) of the waveguide, and a general interference; and the length ($L_{MM}$) is determined with a value when a distance where a cross-state pseudo self-image is formed by the general interference while the first optical signal ($\lambda_1$) proceeds in the multi-mode waveguide (2) is equal to a distance in which a bar-state self-image is formed by the general interference while the second optical signal ($\lambda_2$) proceeds in the multi-mode waveguide (2).

8. The optical wavelength coupler of claim 1, wherein the first optical signal ($\lambda_1$) and the second optical signal ($\lambda_2$) are inputted/outputted at positions determined by a general interference with respect to a width direction of the multi-mode waveguide (2);
 a thickness (d) and width ($W_{MM}$) of the multi-mode waveguide (2) are determined by wavelengths (λ1,λ2) of the applied optical signals, a refractive index (n) of the waveguide, and a general interference; and
 the length ($L_{MM}$) is determined with a value when a distance where a cross-state self-image is formed by the general interference while the first optical signal ($\lambda_1$) proceeds in the multi-mode waveguide (2) is equal to a distance in which a bar-state pseudo self-image is formed by the general interference while the second optical signal ($\lambda_2$) proceeds in the multi-mode waveguide (2).

9. The optical wavelength coupler of claim 1, wherein the first optical signal ($\lambda_1$) and the second optical signal ($\lambda_2$) are inputted/outputted at positions determined by a paired interference with respect to a width direction of the multi-mode waveguide (2);

a thickness (d) and width ($W_{MM}$) of the multi-mode waveguide (2) are determined by wavelengths ($\lambda 1, \lambda 2$) of the applied optical signals, a refractive index (n) of the waveguide, and a paired interference; and the length ($L_{MM}$) is determined with a value when a distance where a bar-state pseudo self-image is formed by the paired interference while the first optical signal ($\lambda_1$) proceeds in the multi-mode waveguide (2) is equal to a distance in which a cross-state self-image is formed by the paired interference while the second optical signal ($\lambda_2$) proceeds in the multi-mode waveguide (2).

10. The optical wavelength coupler of claim 1, wherein the first optical signal ($\lambda_1$) and the second optical signal ($\lambda_2$) are inputted/outputted at positions determined by a paired interference with respect to a width direction of the multi-mode waveguide (2);

a thickness (d) and width ($W_{MM}$) of the multi-mode waveguide (2) are determined by wavelengths ($\lambda 1, \lambda 2$) of the applied optical signals, a refractive index (n) of the waveguide, and a paired interference; and the length ($L_{MM}$) is determined with a value when a distance where a bar-state self-image is formed by the paired interference while the first optical signal ($\lambda_1$) proceeds in the multi-mode waveguide (2) is equal to a distance in which a cross-state pseudo self-image is formed by the paired interference while the second optical signal ($\lambda_2$) proceeds in the multi-mode waveguide (2).

11. The optical wavelength coupler of claim 1, wherein the first optical signal ($\lambda_1$) and the second optical signal ($\lambda_2$) are inputted/outputted at positions determined by a paired interference with respect to a width direction of the multi-mode waveguide (2);

a thickness (d) and width ($W_{MM}$) of the multi-mode waveguide (2) are determined by wavelengths ($\lambda 1, \lambda 2$) of the applied optical signals, a refractive index (n) of the waveguide, and a paired interference; and the length ($L_{MM}$) is determined with a value when a distance where a cross-state pseudo self-image is formed by the paired interference while the first optical signal ($\lambda_1$) proceeds in the multi-mode waveguide (2) is equal to a distance in which a bar-state self-image is formed by the paired interference while the second optical signal ($\lambda_2$) proceeds in the multi-mode waveguide (2).

12. The optical wavelength coupler of claim 1, wherein the first optical signal ($\lambda_1$) and the second optical signal ($\lambda_2$) are inputted/outputted at positions determined by a paired interference with respect to a width direction of the multi-mode waveguide (2);

a thickness (d) and width ($W_{MM}$) of the multi-mode waveguide (2) are determined by wavelengths ($\lambda 1, \lambda 2$) of the applied optical signals, a refractive index (n) of the waveguide, and a paired interference; and the length ($L_{MM}$) is determined with a value when a distance where a cross-state self-image is formed by the paired interference while the first optical signal ($\lambda_1$) proceeds in the multi-mode waveguide (2) is equal to a distance in which a bar-state pseudo self-image is formed by the paired interference while the second optical signal ($\lambda_2$) proceeds in the multi-mode waveguide (2).

* * * * *